Patented Mar. 28, 1950

2,501,967

UNITED STATES PATENT OFFICE 2,501,967

HALOGENATED DI-TERTIARY-ALKYL PEROXIDES

William E. Vaughan, Berkeley, and Frederick F. Rust, Oakland, Calif., assignors to Shell Development Company, San Francisco, Calif., a corporation of Delaware No Drawing. Application January 11, 1950, Serial No. 138,066

11 Claims. (Cl. 260—610)

This invention relates to a class of novel peroxides. More particularly, the invention pertains to halogenated di-tertiary-alkyl peroxides wherein the halogen substituent or substituents have an atomic number below 36.

Suggestions have been given many times in the patents of use as polymerizing catalysts of dialkyl peroxides like diethyl peroxide which have the alkyl group linked to the peroxy radical by a primary carbon atom. However, the danger of violent explosion with such peroxides has also been long known. Upon being heated or subjected to shock these peroxides are likely to explode with violent force. While peroxides of this type are very efficient for effecting polymerization of unsaturated compounds used in the resin industry, their treacherous character has precluded commercial application of them as polymerization catalysts. In our U. S. Patent No. 2,403,771, we have described and claimed a class of dialkyl peroxides which are exceptionally resistant against explosion upon being heated or subjected to shock. We discovered that dialkyl peroxides having the peroxy radical linked directly to a saturated tertiary carbon atom contained in the alkyl radicals are very resistant against decomposition by violent explosion in contrast to the explosive behavior of previously known dialkyl peroxides having the peroxy radical linked to primary or secondary hydrocarbon radicals. Now we have further discovered another class of peroxides which are even more stable against explosion than the peroxides of our patent. Nevertheless, as is also the case with our di-tertiary-alkyl peroxides, the compounds of our present invention are efficient polymerization catalysts.

The novel peroxides of the present invention may be generically represented by the formula

wherein each R represents a hydrocarbon radical in which the carbon atom directly attached to the oxygen atom of the peroxy radical is also attached to three other carbon atoms, and which peroxide also contains one or more halogen atoms of atomic number below 36, i. e. of atomic No. 9 to 35, which includes fluorine, chlorine and bromine, but excludes iodine. A preferred subclass of these compounds has the general formula

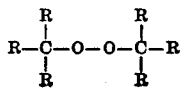

wherein each R represents a like or different alkyl radical, one or more of which is substituted with chlorine and/or bromine. A more complete discussion of representative types of compounds will be given hereinafter in the description of methods for manufacturing them. This is done because the different methods give, in general, a different subclass of compounds although all are halogenated peroxides within the purview of our invention.

The novel compounds of our invention are made possible by the discovery that by having hydrogen bromide present as catalyst in vapor phase treatment with oxygen of unsubstituted or halogenated hydrocarbons containing a saturated tertiary carbon atom to which is directly linked a hydrogen atom, peroxides

and hydroperoxides (R—O—O—H) can be produced. The peroxides and hydroperoxides are obtained by controlled non-explosive catalytic oxidation of the reactants in the presence of added hydrogen bromide while operating with conditions of temperature and pressure below those capable of causing spontaneous combustion with appreciable decomposition or carbon-to-carbon scission of the starting material. The oxidation occurs on the carbon atom or atoms to which a halogen atom would ordinarily attach itself if the starting compound were subjected to a halo-substitution reaction, namely, on the tertiary carbon atom of aliphatic character contained in the starting compound to which is linked a replaceable hydrogen atom. The presence of the added hydrogen bromide has the effect of retarding the explosion or complete combustion of the starting compound and also inhibits decomposition of the carbon structure of the starting compound so that the resultant oxygenated compounds contain at least the same number of carbon atoms per molecule as the starting material.

By employing this method of oxidation with oxygen in the presence of hydrogen bromide, the halogenated peroxides of the present invention are obtained, either directly from the catalytic oxidation or by combination methods of the controlled oxidation in conjunction with an additional step or steps. The methods may be conveniently arranged in the three following groups which outline the types of products obtained.

1. Chlorinated and/or brominated hydrocarbon peroxides, in general, which have the peroxy radical linked to saturated tertiary carbon atoms.

These halogenated products, which are of symmetrical or unsymmetrical structure, are obtained by first producing a di-hydrocarbon peroxide through oxidation of a suitable hydrocarbon and then subjecting the peroxides to halo-substitution with chlorine and/or bromine. For example, isobutane is subjected to controlled non-explosive vapor phase oxidation with oxygen in the presence of added hydrogen bromide as catalyst and the resulting di-tertiary-butyl peroxide is chlorinated whereby there is produced monochloro- and dichloro-di-tertiary-butyl peroxides, as well as more completely substituted products. The method is suitable for obtaining a variety of products of the invention but it has certain limitations and disadvantages in that no single product can be obtained to the exclusion of others but rather a series of compounds with increasing extent of halogen substitution is obtained. Like other halogenation processes, the halogen cannot always be made to substitute into the hydrocarbon radicals of the peroxide at the precise structural point desired while excluding substitution at other structural points in the molecule. Nevertheless, all the chlorine- and/or bromine-substituted peroxides of the invention are obtainable by the method, and these compounds can be separated from the crude product mixture and purified by fractional distillation.

2. Asymmetrical halogenated hydrocarbon peroxides having the peroxy radical linked to saturated tertiary carbon atoms, which peroxides are asymmetrical in having one unsubstituted hydrocarbon radical linked to the peroxy radical and the other substituted with a halogen atom or atoms of atomic No. 9 to 35, as well as, if desired, being further asymmetrical in having a different number and/or configuration of carbon atoms in the two radicals linked to the peroxy radical.

These compounds are prepared by subjecting a halogenated hydrocarbon containing a saturated tertiary carbon atom to the action of oxygen in the presence of hydrogen bromide whereby there is produced the corresponding halogenated hydrocarbon hydroperoxide. This hydroperoxide is then reacted with a mixture of a tertiary alcohol and sulfuric acid of 50% to 75% strength so that the hydrogen atom of the hydroperoxy group is substituted by the hydrocarbon radical of the tertiary alcohol to yield the asymmetrical halogenated peroxide. For example, isobutyl chloride is oxidized with oxygen in the presence of hydrogen bromide to produce monochloro-tertiary-butyl hydroperoxide. This hydroperoxide is then reacted with a mixture of tertiary-butyl alcohol and sulfuric acid whereby monochloro-di-tertiary-butyl peroxide is produced. This method is well suited for production of asymmetrical peroxides in that the structural position of the halogen substituent or substituents can be controlled by choice of the halogenated hydrocarbon subjected to oxidation.

3. Symmetrical halogenated hydrocarbon peroxides having the peroxy radical linked to saturated tertiary carbon atoms and having the halogen atom or atoms of each radical which is linked to the peroxy radical linked to other carbon atoms than the ones directly adjacent to the tertiary carbon atoms linked to the peroxy radical, the halogen atom or atoms having an atomic number of 9 to 35.

These symmetrical peroxides are obtained directly by subjecting to the action of oxygen in the presence of hydrogen bromide a halogenated hydrocarbon containing a saturated tertiary carbon atom and having the halogen substituents linked to a carbon atom or atoms at least once removed from the tertiary carbon atom. For example, isoamyl chloride is treated in the vapor phase of oxygen in the presence of hydrogen bromide and there is obtained bis(1-chloro-3-methylbutyl-3) peroxide.

Further combinations of the above-outlined methods for producing the halogenated peroxides of the invention will, of course, suggest themselves. Thus, isopentane can be oxidized to give tertiary-amyl hydroperoxide. This hydroperoxide is reacted with tertiary-butyl alcohol in sulfuric acid so as to obtain tertiary-butyl, tertiary-amyl peroxide which in turn is then chlorinated and there is produced monochloro-tertiary-butyl, tertiary-amyl peroxide.

In the oxidation step of method 1, there is employed a hydrocarbon containing a saturated tertiary carbon atom having a hydrogen atom linked directly thereto and these may therefore be represented generally by the formula:

wherein each R represents, for example, a like or different alkyl, aryl, aralkyl or alicyclic radical, two of which may be joined to form an alicyclic ring compound. The preferred class comprises saturated aliphatic hydrocarbons containing at least one tertiary carbon atom having three alkyl radicals linked directly thereto, to which tertiary carbon atom is also linked a hydrogen atom. The preferred class includes, but is not limited to, such compounds as isobutane, 2-methylbutane, 2-ethylbutane, 2-methylpentane, 3-methylpentane, 2,3-diemthylbutane, 2,4-dimethylpentane, and their homologues. More generally, one or more of the aliphatic radicals attached to the tertiary carbon atom may be substituted by an aryl, aralkyl or alicyclic radical as is the case with isopropylbenzene, isopropylcyclohexane, 2-phenylbutane, 1-phenyl-2-methylpropane, isopropyltoluene, isopropylnaphthalene, and the like together with their homologues.

The hydrocarbons are substituted to slow (i. e. non-explosive), controlled oxidation, preferably in a tubular reactor. Equivolumetric vaporous amounts of the hydrocarbon and oxygen are forced into the reactor along with about 5% to 10% vaporous hydrogen bromide. The reaction mixture is subjected to a temperature of 150° C to 250° C. whereupon there is obtained the dihydrocarbon peroxide. In order to have the higher boiling hydrocarbons in vapor phase, suitable amounts of inert diluents are used such as steam, nitrogen, carbon dioxide or even methane, which latter is relatively stable at the reaction temperatures. Of the diluents, steam is most advantageous because it can be used to aid distillation of hydrogen bromide as the constant boiling mixture from the reaction products. A full disclosure of this method of preparing the dihydrocarbon peroxides is given in our U. S. Patent Nos. 2,395,523 and 2,403,772.

The dihydrocarbon peroxides produced as indicated above are subjected to halogen substitution with chlorine and/or bromine. This is done in liquid phase, preferably by dispersing the gaseous halogen through the peroxide which is irradiated with light. In general, the peroxides used as reactants are liquid substances and can be halogenated at temperatures of about 20° C. to 75° C., preferably at about 25° C. to 50° C. In the case of peroxides which are solid at the operating temperature, they can be placed in a solution with carbon tetrachloride in order to effect the halogenation thereof. The light used to catalyze the halogenation reaction can be natural sunlight, light from an electric sunlamp, or ultraviolet light from the mercury lamp. When it is desired to favor production of monohalogen peroxides, equimolar quantities, or even less, of halogen to peroxide are used. When more completely halogenated peroxides are desired, larger ratios of halogen are introduced into the peroxide. If desired, the peroxide can be completely substituted by exhaustive halogenation. While it is ordinarily preferred to have the peroxide halogenated with only a single halogen, that is, either chlorine or bromine, both halogens can be introduced into the compounds by successive treatments. To accomplish this, the peroxide is first brominated and then the bromo-substituted peroxide is chlorinated so as to obtain the mixed halogen peroxide.

The halogenated peroxides including structural isomers can be recovered from the reaction mixture and separated by fractional distillation. This is made possible owing to the remarkable stability of the compounds of the invention against explosion.

It may be noted that it is entirely unexpected that the halogenated hydrocarbon peroxides could be obtained by halo-substitution of the hydrocarbon peroxides. In the halo-substitution reaction, a hydrogen halide is produced as by-product and is present in the reaction mixture. Peroxides known heretofore are powerful oxidizing agents and it would be expected that the peroxides would oxidize the hydrogen halide present in the reaction mixture with the result that the peroxide is reduced or destroyed. Such, however, is not the case since very good yields of halogenated peroxides can be obtained. Among typical, but non-limiting, compounds of the invention which are obtainable by method 1 are: Mono-, di-, tri-, poly-chloro-di-tertiary-butyl peroxide, -di-tertiary-amyl peroxide, -di-tertiary-hexyl peroxide, as well as the corresponding bromo compounds and the mixed halogen compounds where one or more chlorine atoms is substituted by bromine atom. Among other compounds, the method produces symmetrical halo-substituted peroxides wherein the halogen atoms are of even number and alike as is the case, for example, with bis[(1-chloro-2,2-dimethyl)ethyl-2]peroxide or symmetrical dichloro-di-tertiary-butyl peroxide. If desired, mixed tertiary-alkyl peroxides can be chlorinated and/or brominated so as to obtain, for example, chloro-tertiary-butyl tertiary-amyl peroxide, chloro-tertiary-amyl tertiary-butyl peroxide, bromo-tertiary-butyl tertiary-hexyl peroxide, and the like. The chlorinated and/or brominated saturated hydrocarbon peroxides of this type are preferred compounds. However, the method is also suitable to obtain more complex compounds such as, for example, monochloro-, dichloro-, and polychloro-bis(phenyl dimethyl carbinyl) peroxide, bis(phenyl methyl ethyl carbinyl) peroxide, bis(ditolyl methyl carbinyl)peroxide, bis(cyclohexyl methyl isopropyl carbinyl)-peroxide, and the like, together with the corresponding bromo compounds and the mixed halogenated compounds containing both chlorine and bromine as substituents.

Method 2 provides means for preparing the asymmetrical peroxides of the invention. A halogenated hydrocarbon containing a saturated tertiary carbon atom which has a hydrogen atom directly linked thereto is subjected to non-explosive oxidation with oxygen in the presence of hydrogen bromide. As starting materials there are used halogenated hydrocarbons of the formula

wherein each R can, for example, be a like or different alkyl, aryl, aralkyl, or alicyclic radical, one or more of which contains at least one substituent from the group consisting of fluorine, chlorine and bromine, which substituents may be like or different. Preferably each R is an alkyl radical, one or more of which is substituted with chlorine and/or bromine. These halogenated hydrocarbons are oxidized with oxygen, preferably using approximately equivolumetric vaporous amounts, and added hydrogen bromide is present to catalyze and control the reaction. Temperatures of 150° C. to 250° C., preferably in the neighborhood of 200° C., are used. With less volatile reactants an inert diluent like steam, nitrogen or carbon dioxide is employed to maintain the reacted mixture vaporous during the treatment.

When the halogenated hydrocarbon is one having the halogen substituent linked to the carbon atom directly adjacent to the tertiary carbon atom of aliphatic character, to which is linked the replaceable hydrogen atom, it was found that hydroperoxides are obtained. It appears that the proximity of the halogen atom to the point of oxidation in the compound favors formation of hydroperoxides rather than peroxides. For example, when isobutyl chloride is oxidized with oxygen in the presence of hydrogen bromide, production of monochloro-tertiary-butyl hydroperoxide is favored. This is true regardless of the concentration of added hydrogen bromide which has an effect on the relative proportions of peroxide and hydroperoxide produced when the reactant is an unsubstituted hydrocarbon.

In this manner such compounds as isobutyl chloride, isobutyl bromide, 1,1-dichloro-2-methylpropane, 1-chloro-1-bromo-2-methylpropane, 1-chloro-2-chloromethylpropane, 1-chloro-2-bromomethylpropane, 1,2-dichloro-2,3-dimethylbutane, 1-chloro-2-phenylpropane 1-bromo-2-benzylpropane, 1-chloro-2-cyclohexylpropane, 1,1-bis(chlorophenyl)-2,2,2-trichloroethane and the like, are converted into the corresponding hydroperoxides. Although it is preferred to use such chlorinated and/or brominated hydrocarbons as reactants, fluorinated compounds can also be used. For example, there can be used as reactants such compounds as isobutyl fluoride, 1,1-difluoro-2-methylpropane, 1-fluoro-1-chloro-2-methylpropane, 1-fluoro-2-phenylbutane, 2-fluoro-1,1-dimethylpropane, and the like. The fluorine-containing hydrocarbons referred to in the present application can be prepared from self-evident appropriate starting materials by addition of hydrogen fluoride to compounds containing an aliphatic double bond, or by treating the corresponding chlorinated compound with hydrogen fluoride whereby fluorine atoms are substituted for chlorine atoms according to the general methods described in Jour. Am. Chem. Soc., vol. 67, pages 1194 to 1199.

When the halogenated hydrocarbon has the halogen atom or atoms linked to a carbon atom at least once removed from the tertiary carbon atom, as is the case with isoamyl chloride, the oxidation in the above-described manner produces both peroxides and hydroperoxides apparently owing to the fact that the halogen atom is sufficiently removed so as to have its effect lost or diminished. By employing vaporous volumes of added hydrogen bromide catalyst in substantial amounts, e. g. 1% to 2%, but not more than about 10%, the formation of the hydroperoxide over the peroxide can be favored. In this manner the corresponding hydroperoxide can be obtained from such representative compounds as isoamyl chloride, isoamyl bromide, 1-chloro-3-methylpentane, 1-bromo - 3 - methylpentane, 1-chloro-2-bromo-4-methylpentane, 1,1-dichloro-3-methylbutane, 2-chlorophenylpropane, 1-chloro-3-phenyl-4-methylpentane, and the like, together with their homologues. If desired, fluorine-containing hydrocarbons can also be used, such as isoamyl fluoride, 1,1-difluoro-3-methylbutane, 1-chloro-1-fluoro-3-methylbutane, 1-fluoro-3-methylpentane, 2-fluoro-4-phenylpentane, 1-fluoro-3-cyclopentylbutane, and the like, although compounds containing fluorine are less preferred than chlorinated and/or brominated hydrocarbons.

The hydroperoxides are, in general, somewhat water-soluble and can be recovered by extracting the reaction mixture with water. Halogenated alcohols, e. g. isobutylene chlorhydrin, are also produced and will be present in the water extract. The hydroperoxide can be separated therefrom by extracting the water extract with tertiary-butyl chloride or ethers like diisopropyl ether from which the hydroperoxide is recovered by distillation. If desired, the initial reaction mixture can be distilled, preferably at reduced pressure, e. g. 5 to 10 mm., to recover the hydroperoxides. A full description of this method of oxidizing the halogenated hydrocarbons to produce the hydroperoxides is described in our U. S. Patent No. 2,446,797.

The asymmetrical halogenated peroxides of the invention are obtained by reacting the hydroperoxides produced as described above with tertiary alcohols in the presence of sulfuric acid. For this purpose there is used an alcohol having the hydroxy group linked directly to a saturated tertiary carbon atom such as, for example, tertiary-butyl, tertiary-amyl, tertiary-hexyl, phenyl dimethyl carbinyl, diphenyl methyl carbinyl, tolyl phenyl ethyl carbinyl, naphthyl dimethyl carbinyl, cyclopentyl dimethyl carbinyl, and the like. To obtain the desired peroxide, approximately equimolar proportions of the tertiary alcohol and sulfuric acid of about 65% strength are mixed. To a 10% to 50% excess of this mixture is then added the hydroperoxide. The mixture is commingled at a temperature to about 10° C. to 40° C., higher temperatures being avoided to minimize formation of hydrocarbon polymers from the tertiary alcohol. The desired peroxides will appear as an upper layer on the reaction mixture from which it is separated and washed with water to remove sulfuric acid and organic sulfates.

Depending on the choice of hydroperoxides and tertiary alcohol, the method enables peroxides to be obtained, which, besides being asymmetrical in having halogen on only one side of the peroxy radical, are asymmetrical with respect to the number of carbon atoms and/or structural carbon configuration of the two radicals linked to the peroxy radical. For example, by using 1-chloro-2,3-dimethyl-2-hydroperoxy butane with 2,3-dimethyl-2-hydroxy butane, there is produced (1 - chloro - 2,3 - dimethyl) butyl-2,(2,3-dimethyl) butyl-2 peroxide; with tertiary-butyl alcohol there is produced (1-chloro-2,3-dimethyl) butyl - 2,(2 - methyl) propyl - 2 peroxide; and with 2-methyl-2-hydroxy pentane there is produced (1 - chloro-2,3-dimethyl) butyl-2,(2-methyl) pentyl-2 peroxide.

It might be expected that peroxides with halogen atoms substituted to the hydrocarbon radical on each side of the peroxy radical could be obtained from this method from use of halogenated tertiary alcohols. Such is not the case, however, owing to some unexplainable reason which often occurs in chemistry. Thus, upon attempting to react monochloro-tertiary-butyl hydroperoxide with monochloro-tertiary-butyl alcohol (isobutylene chlorhydrin), none of the desired dichloro-di-tertiary-butyl peroxide is produced apparently owing to the presence of the chlorine atom in the tertiary alcohol.

Compounds of the invention produced by method 2 can be represented by the formula

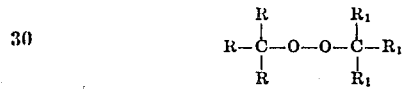

wherein each R and $R_1$ is a like or different alkyl, aryl, aralkyl, or alicyclic radical and one or more of the radicals represented by R contain one or more halogen substituents of atomic No. 9 to 35. Preferably, the compounds contain but a single chlorine or bromine atom and it is also desirable that the peroxides are aliphatic compounds. Among representative members are included Monochloro-di-tertiary-butyl peroxide
Monobromo-di-tertiary-amyl peroxide
Monofluoro-di-tertiary-butyl peroxide
Monochloro - tertiary - butyl,tertiary - amyl peroxide
(1,1 -dichloro-2-methyl) propyl-2,(2-methyl) propyl-2 peroxide
(1-chloro-1-bromo-2-methyl) propyl - 2,(2-methyl) propyl-2 peroxide
(1 - chloro - 1-fluoro-2-methyl) butyl -2,(2-methyl) butyl-2 peroxide
(1 - chloro - 2 - chloromethyl) propyl - 2,(2-methyl) propyl-2 peroxide
(1 - chloro - 2 - bromomethyl) propyl -2,(2-methyl) propyl-2 peroxide
(1,1 - chloro - 2-chloromethyl) propyl -2,(2-methyl) butyl-2 peroxide
(1 - chloro-2-methyl) propyl -2,(2,3-dimethyl) butyl-2 peroxide
(1 - bromo-2-methyl) propyl-2,(2,3-dimethyl) butyl-2 peroxide
(1 - fluoro-2-methyl) propyl- 2,(2,3-dimethyl) butyl-2 peroxide
(1-chloro-2-phenyl) propyl-2,(2-methyl) propyl-2 peroxide
(1-chloro-2-methyl-3-phenyl) propyl -2,(2-methyl) propyl-2 peroxide
(1-bromo-2-methyl-3-phenyl) propyl -2,(2-methyl) propyl-2 peroxide
(2 - chlorotolyl) propyl -2,(2-methyl) butyl-2 peroxide
(1 - chloro-2-methyl) propyl -2,(2-naphthyl) propyl-2 peroxide (1 - bromo-2-methyl)propyl -2,(2-naphthyl)propyl-2 peroxide
(1 - fluoro-2-methyl)propyl - 2,(2-naphthyl)propyl-2 peroxide
(1-chloro-2-cyclohexyl)propyl -2,(2-methyl)propyl-2 peroxide
(1-chloro-2-methyl)propyl -2,(2-cyclohexyl)propyl-2 peroxide
(1-bromo-2-methyl)propyl-2,(2-cyclopentyl)propyl-2 peroxide
(1 - fluoro-2-methyl)propyl-2,(2-cyclohexyl)propyl-2 peroxide and the like, together with their homologues.

Method 3 provides means for preparing symmetrical halogenated peroxides of the invention wherein the peroxy radical is linked at each end to a saturated tertiary carbon atom and no halogen atoms are linked to the carbon atoms directly adjacent to the tertiary carbon atom. These are produced by oxidizing a suitable halogenated hydrocarbon with oxygen in the presence of added hydrogen bromide. Like in method 2, the reaction is effected at about 150° C. to 250° C., preferably at about 200° C. Approximately equivolumetric vaporous ratios of halogenated hydrocarbon and oxygen are used, and in order to favor formation of the peroxide, rather than the hydroperoxide, a vaporous volumetric proportion of hydrogen bromide equal on the basis of the volume of halogenated hydrocarbon to about 10% to 20% is used. Larger amounts can be used, if desired, but the directive effect of the type of product obtained is not greatly increased above about 20% of hydrogen bromide. When high boiling hydrocarbons are employed as reactant, they are maintained in vapor phase in the reaction zone by use of inert diluents like steam, nitrogen or carbon dioxide. The halogenated peroxides may be recovered by distillation in vacuo, preferably at about 1 to 10 mm. pressure. A full disclosure of the method is described in our U. S. Patent No. 2,446,797.

Peroxides of the invention obtained by this method can be represented by the formula

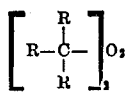

wherein each R is a like or different alkyl, aryl, aralkyl or alicyclic radical, one or more of which contains as substituents one or several halogen atoms of atomic No. 9 to 35 on other carbon atoms than those directly linked to the saturated tertiary carbon atom. Preferably the compounds are saturated aliphatic peroxides. Any particular peroxide of this subclass of the invention is obtained by the oxidation of the corresponding halogenated hydrocarbon. For example, bis-[(1-chloro-3-methyl)butyl-3]peroxide, which is a dichloro-di-tertiary-amyl peroxide, is obtained by oxidation of 1-chloro-3-methyl butane or iso-amyl chloride. Thus, by use of the corresponding halogenated hydrocarbons, the method produces such other typical compounds as Bis[(1,1-dichloro-3-methyl)butyl-3]peroxide
Bis[(1-bromo-1-chloro-3 - methyl)butyl - 3]peroxide
Bis[(1,1,1-trichloro-3-methyl)pentyl-3]peroxide
Bis[(1-chloro-3-ethyl)pentyl-3]peroxide
Bis[(2-chloro-3-methyl)pentyl-4]peroxide
Bis[(1,5-dichloro-3-methyl)pentyl-3]peroxide
Bis[(1-chloro-1-phenyl-3-methyl)butyl - 3]peroxide
Bis[(1-chloro-3-phenyl)butyl-3]peroxide
Bis[(1-chloro-3-methyl-4-phenyl)butyl - 3]peroxide
Bis[(1-bromo-3-tolyl)butyl-3]peroxide
Bis[(1-chlorophenyl)propyl-2]peroxide
Bis[(1-chloro-3-naphthyl)butyl-3]peroxide
Bis[(1-chloro-3-cyclohexyl)butyl-3]peroxide
Bis[(1-bromo-3-cyclopentyl)butyl-3]peroxide and the like together with their homologues. While such chlorine and/or bromine substituted compounds are preferred, the symmetrical peroxides can contain fluorine atoms as substituents, if desired, as is the case, for example, in compounds such as Bis[(1-fluoro-3-methyl)butyl-3]peroxide
Bis[(1-chloro-1-fluoro-3 - methyl)butyl - 3]peroxide
Bis[(2-fluoro-4-methyl)pentyl-4]peroxide
Bis[(2-bromo-2-fluoro-4-methyl)pentyl -4 ]peroxide
Bis[(1-fluoro-3-phenyl)butyl-3]peroxide
Bis[(1-fluoro-4-cyclohexyl)pentyl-4]peroxide and the like, together with their homologues.

While the foregoing description has shown and suggested how all the compounds of the invention can be prepared, certain types of compounds are preferred over others. It is thus preferred that the peroxides be saturated aliphatic compounds; that each of the two radicals linked directly to the peroxy radical contain not more than 6 carbon atoms each and that each contains but a single halogen atom which is preferably chlorine or bromine; and that most preferably the peroxides are asymmetrical in containing only one chlorine or bromine atom.

For the purpose of illustrating in detail preparation of some compounds of the invention together with their properties, the following examples are given. However, it is to be distinctly and unequivocally understood that the other compounds of the invention can be made in the manner of the foregoing described methods and, where appropriate, by the methods of these examples.

*Example I*

The reactor consisted of a coil of glass tubing having an internal diameter of 25 mm. This coil having a volume of about 3 liters was immersed in an oil bath fitted with a thermostat which provided accurate control of the reaction temperature. The feed to the reactor was preheated, mixed and then conveyed through the reactor at a temperature of about 170° C. under substantially atmospheric pressure. Measured in volumes of vapor at normal temperature and pressure (20° C. and 1 atmos.), feed was conveyed into the reactor at the following rates: isobutyl chloride, 275 cc. per minute; oxygen, 275 cc. per minute; and hydrogen bromide, 45 cc. per minute. The reaction products were conveyed through water to separate the water-soluble compounds from the water-insoluble phase. The latter was collected and extracted further with water to effect substantially complete removal of water-soluble compounds. This water-extract was combined with the first extract and subjected to extraction with tertiary-butyl chloride for removal of the chloro-tertiary-butyl hydroperoxide. The latter compound was obtained from the tertiary-butyl chloride by distillation in vacuo.

A substantially pure sample of the monochloro-tertiary-butyl hydroperoxide was added to a 35% molecular excess of tertiary-butyl alcohol dissolved in an equimolar quantity of 65% sulfuric acid at room temperature. After standing about 16 hours at room temperature, an upper layer which had risen to the surface of the reaction mixture was separated. This was washed with 6N sulfuric acid and water. Analysis showed the liquid monochlor-di-tertiary-butyl peroxide to be of the formula

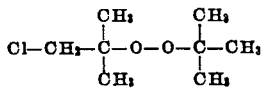

| | Per cent |
|---|---|
| Carbon | 52.8 |
| Theory | 53.1 |
| Hydrogen | 9.4 |
| Theory | 9.4 |
| Chlorine | 19.8 |
| Theory | 19.7 |

The liquid had a refractive index of $n_D^{20}=1.4210$ and a freezing point of $-31°$ C. Measurements of vapor pressure gave 4.10 mm. at 32.6° C. and 45.36 mm. at 76.97° C., indicating a boiling point at 1 atmos. pressure of about 160° C.

*Example II*

The reactor described in Example I was employed to effect catalytic oxidation of isobutyl bromide at a temperature of about 160° C. The vaporous feed was introduced at the rate of 275 cc. per minute of isobutyl bromide, 275 cc. per minute of oxygen, and 50 cc. per minute of hydrogen bromide. The products were recovered as previously described except that the aqueous water extract was extracted with ether, instead of tertiary-butyl chloride, in order to recover the bromo-tertiary-butyl hydroperoxide.

A sample analyzing 30% of monobromo-tertiary-butyl hydroperoxide was reacted with an excess of an equimolar mixture of tertiary-butyl alcohol and 65% sulfuric acid. After standing for 72 hours at temperatures of 15 to 30° C., an upper phase which appeared was removed. It was a water-insoluble liquid having a refractive index of $n_D^{20}=1.4448$ and the ability to oxidize hydrogen iodide which is characteristic of peroxides. Analysis showed 38.4% bromine as compared with 35.6% calculated for mono-bromo-di-tertiary-butyl peroxide of the formula

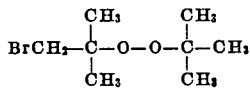

*Example III*

Chlorinated di-tertiary-butyl peroxide was prepared by chlor-substitution of the parent peroxide in the presence of actinic light. Chlorine was bubbled into about 431 g. (2.95 mols) of di-tertiary-butyl peroxide contained in a Pyrex flask at 30° C. to 40° C. until the weight of the reaction mixture was about 501 g. (1.98 mols of substituted chlorine). The flask was irradiated with light from a 500 watt projection lamp adjacent thereto. The reaction mixture was distilled to recover the chlorinated products and about 152 g. of monochloro-di-tertiary-butyl peroxide was obtained representing a yield of 42.5% based on the chlorine input. The mono-chloro peroxide had a refractive index of $n_D^{20}=1.4211$ and distilled at 55° C. under 20 mm. pressure.

The dichlorides from several runs performed as described above were combined. The material boiled from 55° C. to 70° C. at 4-5 mm. and had a chlorine content of 33.3% as compared with the theoretical value of 33.0%. Further fractionation gave two cuts having the following properties, which constituted the largest amount of the product:

46° C.–50.5° C. at 5 mm. Hg; $n_D^{20}=1.4447$
57° C.–59° C. at 5 mm. Hg; $n_D^{20}=1.4462$

The method enables production of isomeric dichlorides having the following structural formulas:

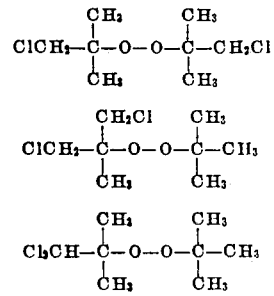

The lower halogenated hydrocarbon peroxides of the invention are water-white, water-immiscible liquids of pleasant odor. Higher members having larger numbers of carbon atoms or a greater proportion of halogen substituents are white crystalline solids. In contrast to previously known peroxides having the peroxy radical linked to primary or secondary carbon atoms, the compounds of the invention are remarkably resistant against explosion upon being heated or subjected to shock. In this unexpected respect, they are even more resistant than the di-tertiary-alkyl peroxides of our U. S. Patent No. 2,403,771, which has the peroxy radicals linked to tertiary carbon atoms, of which di-tertiary-butyl peroxide is a typical example. The unusual stability of di-tertiary-butyl peroxide and its mono and dichloro derivatives will be evident from the following results obtained in tests:

A drop of diethyl peroxide was permitted to fall on a brass block heated to about 248° C. whereupon a mild explosion with a flash occurred. At somewhat higher temperatures the noise and violence of the explosion were more pronounced. In this test, di-tertiary-butyl peroxide did not flash or explode even when the block was heated to about 620° C., at which temperature the block had a dull red color. The peroxide merely flash-vaporized upon striking the block.

When diethyl peroxide was poured over glass chips at 55° C. to 65° C., it burst into flame or exploded when the wetted chips were struck with a hammer. Di-tertiary-butyl peroxide could not be ignited or exploded even at about 105° C., near its boiling point, despite repeated blows with the hammer.

In order to obtain information on the possibility of the peroxides exploding by shock, some experiments were performed using techniques applied to materials in the explosive industry. It was found that di-tertiary-butyl peroxide could be detonated by the use of No. 6 blasting caps, but that the explosion had little power or brisance. In contrast, ethyl nitrate was detonated by No. 6 blasting caps with great brisance even when the cap was as much as four inches from the sample. No corresponding test was attempted with the explosive diethyl peroxide.

Further conventional explosive tests were made by placing a No. 6 blasting cap in contact with a sample which was contained in a glass vial. The glass vial was inserted in a hole in a steel block six inches long and three and one-quarter inches in diameter. The sample was then subjected to the violent shock of the blasting cap in the confined space of the testing block. In the course of this study on sensitivity to shock, it was discovered that di-tertiary-butyl peroxide along with its mono and dichloro derivatives were so stable that they displayed the unusual behavior of "partial" detonation. This is a property of exceptional rarity among substances suspected of being explosive. Whereas a given volume of the liquid under test in the block will completely detonate when the cap in contact with it is exploded, a slightly larger volume is unable to transmit the explosive wave efficiently and as a result some liquid remains in the test block. Thus, with successively increasing volumes of liquid, there is complete detonation with disappearance of all the liquid up to a particular volume. Beyond this volume, some liquid remains after the detonation. This is because the material tested has sufficient stability against shock that the force of the explosive wave traveling through it does not maintain sufficient intensity to detonate all of the sample when its volume is above the critical volume. In other words, the material has the property of being, what might be termed, self-quenching upon being detonated since above the critical volume the material itself cannot support the explosive progress of the detonation.

In this test it might be thought that the explosion of the blasting cap alone would merely blow all the sample out of the test block. However, a blank test shows that liquid remains in the test block when a No. 6 cap is detonated in contact with as little as 0.12 cc. of water. The results of the test are summarized in the following table:

| Peroxide | Region of complete detonation in which no liquid remained, cc. of sample | Region of partial detonation in which liquid remained, cc. of sample |
|---|---|---|
| Di-tertiary-butyl peroxide | 0 to 7 | 8 and up |
| Monochloro-di-tertiary-butyl peroxide | 0 to 4 | 5 and up |
| Dichloro-di-tertiary-butyl peroxide | 0 to 2 | 3 and up |

The results in the table show that with di-tertiary-butyl peroxide, a volume up to 7 cc. results in complete detonation while the same volume with the monochloro derivative does not give complete detonation and liquid remains. The monochloro derivative therefore has less sensitivity to shock than di-tertiary-butyl peroxide. Furthermore, the dichloro compound shows less sensitivity than either di-tertiary-butyl peroxide or the monochloro derivative. Although these tests enabled determination of the relative resistance to shock of the three peroxides, it is apparent that each is very stable. In customary commercial uses of the peroxides, they would, of course, never be subjected to the potent shock of a blasting cap in a confined space. But, even if a shock like that occurred, large volumes would never be completely detonated.

It is evident from all the tests that di-tertiary-butyl peroxide is extremely stable against explosion by heating or being subjected to shock in comparison to diethyl peroxide, and that the monochloro and dichloro derivatives of the present invention are even more stable than is di-tertiary-butyl peroxide.

In spite of the fact that the halogenated peroxides of the invention are substantially stable against explosion upon being heated or subjected to shock, they have nevertheless excellent activity as polymerization catalysts. This will be evident from the results in the table given below on polymerization of diallyl phthalate. This ester by containing two polymerizable olefinic groups, i. e. two allyl groups, is capable of polymerizing to cross-linked, three dimensional, hard polymers characterized by being insoluble and infusible in contrast to a singly unsaturated compound like vinyl acetate, for example, which polymerizes only to linear polymers and cannot cross-link to give insolubility and infusibility. When diallyl phthalate polymerizes, it passes through several successive stages. A linear polymer first forms which is soluble in monomeric diallyl phthalate. Upon being polymerized, the monomer forms increasing amounts of the soluble polymer and the mixture becomes viscous. Then, as cross-linking occurs, the mixture suddenly gels. Further polymerization of the gel converts it to the final polymer which becomes increasingly hard as the polymerization progresses.

The time required for the diallyl phthalate to gel with a given concentration of polymerization catalyst is a measure of the catalyst activity. Furthermore, the time necessary to obtain a given degree of hardness also indicates the activity of the catalyst. In the results tabulated below, there is given the gelation time for the noted temperatures and catalyst concentrations as well as the time for the polymer to reach a Barcol hardness of 25 which is considered a satisfactory degree of hardness in the resin industry. For comparison with results from halogenated peroxides of the invention, results are also given with di-tertiary-butyl peroxide and benzoyl peroxide, the latter being a commonly used catalyst in the polymerization art. Benzoyl peroxide has a different temperature range of activity than the other peroxides because it decomposes rapidly above about 80° C. with the result that its activity is lost at higher temperatures. Consequently, it must be used at lower temperatures than the other peroxides. To save space in the table, monochloro-di-tertiary-butyl peroxide is designated as "monochloro derivative" and dichloro-di-tertiary-butyl peroxide is designated as "dichloro derivative."

| Peroxide | Temp. °C. | Percentage Peroxide | Gelation Time, Hours | Time to Reach Barcol Hardness of 25, Hours |
|---|---|---|---|---|
| Benzoyl | 60 | 2 | 24.8 | 144 |
| Do | 70 | 2 | 8.8 | 45 |
| Di-tertiary-Butyl | 90 | 2 | 21.1 | 180 |
| Monochloro Derivative | 90 | 2 | 22.8 | |
| Dichloro Derivative | 90 | 2 | 25 | 175 |
| Di-tertiary-Butyl | 105 | 1 | 5.6 | 40 |
| Monochloro Derivative | 105 | 1 | 6.3 | 48 |
| Dichloro Derivative | 105 | 1 | 6.3 | 48 |
| Di-tertiary-Butyl | 115 | 1 | 2.8 | 16 |
| Monochloro Derivative | 115 | 1 | 2.8 | 14 |
| Dichloro Derivative | 115 | 2 | 1.5 | 15 |

The foregoing results show that monochloro- and dichloro-di-tertiary-butyl peroxide have about the same activity as a polymerization catalyst as the unsubstituted di-tertiary-butyl peroxide and that these are as active as benzoyl peroxide while operating at higher temperature.

This application is a continuation-in-part of our copending application, Serial No. 649,116, filed February 20, 1946, which is a continuation-in-part of our applications, Serial No. 474,224, filed January 30, 1943, now U. S. Patent No. 2,395,523, and Serial Nos. 510,420 and 510,421, filed November 15, 1943, now U. S. Patent Nos. 2,403,771 and 2,403,772, respectively.

We claim as our invention:

1. A halogen-substituted peroxide in which a halogen atom of atomic Number 9 to 35 replaces at least one hydrogen atom of a molecule consisting of two monovalent tertiary hydrocarbon radicals, which are free of aliphatic multiple bonds, and at least one of which is a saturated aliphatic radical, joined by a peroxy group (—O—O—) attached to a tertiary-carbon atom in each radical.

2. A halogen-substituted peroxide in which a halogen atom of atomic Number 9 to 35 replaces at least one hydrogen atom of a molecule consisting of two monovalent saturated aliphatic tertiary hydrocarbon radicals joined by a peroxy group (—O—O—) attached to a tertiary-carbon atom in each radical.

3. A halogen-substituted di-tertiary-alkyl peroxide wherein the halogen contained in said peroxide is of atomic Number 9 to 35.

4. A monohalo-di-tertiary-alkyl peroxide wherein the halogen atom contained in said peroxide is of atomic Number 9 to 35.

5. A chloro-substituted di-tertiary-alkyl peroxide.

6. Monochloro-di-tertiary-alkyl peroxide.

7. A dichloro-di-tertiary-alkyl peroxide.

8. Monobromo-di-tertiary-alkyl peroxide.

9. Monochloro-di-tertiary-butyl peroxide.

10. A dichloro-di-tertiary-butyl peroxide.

11. Monobromo-di-tertiary-butyl peroxide.

WILLIAM E. VAUGHAN.
FREDERICK F. RUST.

No references cited.